(12) United States Patent
Takemoto et al.

(10) Patent No.: US 9,065,994 B2
(45) Date of Patent: Jun. 23, 2015

(54) IMAGE PICKUP APPARATUS

(71) Applicant: CANON KABUSHIKI KAISHA, Tokyo (JP)

(72) Inventors: Shoichi Takemoto, Saitama (JP); Ryuji Ohmuro, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 195 days.

(21) Appl. No.: 13/894,697

(22) Filed: May 15, 2013

(65) Prior Publication Data

US 2013/0314589 A1 Nov. 28, 2013

(30) Foreign Application Priority Data

May 24, 2012 (JP) .................................. 2012-118537

(51) Int. Cl.

| G02B 27/10 | (2006.01) |
| G02B 27/14 | (2006.01) |
| H04N 9/097 | (2006.01) |
| H04N 5/225 | (2006.01) |
| G03B 33/12 | (2006.01) |

(52) U.S. Cl.
CPC ............. *H04N 5/2254* (2013.01); *H04N 9/097* (2013.01); *G02B 27/145* (2013.01); *G02B 27/1013* (2013.01); *G03B 33/12* (2013.01)

(58) Field of Classification Search
CPC combination set(s) only.
See application file for complete search history.

(56) References Cited

U.S. PATENT DOCUMENTS

| 4,084,179 | A | * | 4/1978 | Sekiguchi | 348/339 |
| 5,777,674 | A | * | 7/1998 | Ohmuro | 348/338 |
| 6,078,429 | A | * | 6/2000 | Lyon | 359/634 |
| 6,342,980 | B1 | * | 1/2002 | Omuro | 359/834 |
| 6,542,193 | B1 | * | 4/2003 | Yoshikawa et al. | 348/338 |
| 2006/0279846 | A1 | * | 12/2006 | Ring et al. | 359/634 |
| 2007/0115376 | A1 | * | 5/2007 | Igarashi | 348/262 |
| 2009/0079834 | A1 | * | 3/2009 | Otsu | 348/169 |
| 2009/0086324 | A1 | * | 4/2009 | Saita et al. | 359/589 |
| 2012/0050877 | A1 | * | 3/2012 | Saita | 359/634 |

FOREIGN PATENT DOCUMENTS

| JP | 2005-181512 A | 7/2005 |
| JP | 2005-227364 A | 8/2005 |

* cited by examiner

*Primary Examiner* — Roberto Velez
*Assistant Examiner* — Tuan Le
(74) *Attorney, Agent, or Firm* — Rossi, Kimms & McDowell LLP (57) ABSTRACT

An image pickup apparatus, including: a filter including transmittance variable element and adjusting amount of incident light from lens; a photoelectric transducer; and guide optical system guiding the incident light from the filter to the photoelectric transducer. The guide optical system includes color separation optical system including, in order from object side, first prism having first dichroic film, second prism having second dichroic film, and third prism, to separate the incident light into red, green, and blue. The first or second dichroic film is blue reflection dichroic film. Rotational position of the transmittance variable element about optical axis is such a position that ratio of transmittance for blue to transmittance for green of marginal ray entering the blue reflection dichroic film at incident angle smaller than principal ray of axial ray to the blue reflection dichroic film is smaller than such ratio of the principal ray of axial ray.

7 Claims, 7 Drawing Sheets

IMAGE PICKUP APPARATUS

BACKGROUND OF THE INVENTION

1. Field of the Invention

The present invention relates to an image pickup apparatus, and more particularly, to an image pickup apparatus including a color separation optical system.

2. Description of the Related Art

Hitherto, when subject luminance is too high in an image pickup system, a predetermined amount or more of light may enter an image pickup element even though a stop is stopped down to a minimum diameter. In addition, when the stop is stopped down, performance degradation may occur due to diffraction phenomena and may cause a problem. Therefore, a neutral density (ND) filter is disposed between an image pickup lens and an image pickup element so as to limit an amount of light entering the image pickup element. As the ND filter, there is often used a glass filter manufactured by melting glass (transparent substrate) having an absorbing substance added thereto, or by applying an organic dye or pigment onto a glass plate (transparent substrate). Because the ND filter manufactured in this method has only a single transmittance, a filter disc including multiple ND filters having different densities is disposed so as to realize an image pickup apparatus having multiple transmittances.

However, when using the filter disc, a space for holding multiple elements and a drive mechanism for switching the filter disc are necessary, and hence downsizing has been difficult. In addition, there has been a problem that a filter holding frame appears as a shadow on a screen when switching the ND filter and a problem that the light amount can be adjusted only step by step.

In order to solve the above-mentioned problems, there is known a transmittance variable filter using a physical property element as a light amount adjusting filter. In particular, a transmittance variable filter using a liquid crystal element can continuously change the transmittance by applying a voltage to the liquid crystal element, and hence it is possible to reduce the number of filters or to eliminate the drive mechanism. On the other hand, because the liquid crystal element has a view angle characteristic, an inclination of a light ray entering the element causes a variation of a spectral transmittance of the light ray. Then, as a result, there is a problem that angle shading occurs in which unevenness is generated in luminance or color in the screen. Note that, the view angle characteristic is caused by a variation in magnitude of a birefringence effect of liquid crystal molecules depending on an incident angle of the light, because an angle between the direction of liquid crystal molecules and the optical axis (of an optical system including a lens apparatus and an image pickup apparatus) varies when the voltage is applied so as to change the transmittance.

Japanese Patent Application Laid-Open No. 2005-227364 discloses a dimmer element in which multiple liquid crystal elements are combined and the elements are driven in a dimmer control range having a small view angle characteristic so as to suppress the view angle characteristic. Japanese Patent Application Laid-Open No. 2005-181512 discloses a method of suppressing an unnatural brightness difference in a taken image by disposing a liquid crystal dimmer element in the optical path so that an alignment direction of the liquid crystal dimmer element becomes substantially parallel to a short side of the imaging surface.

Figure 10:
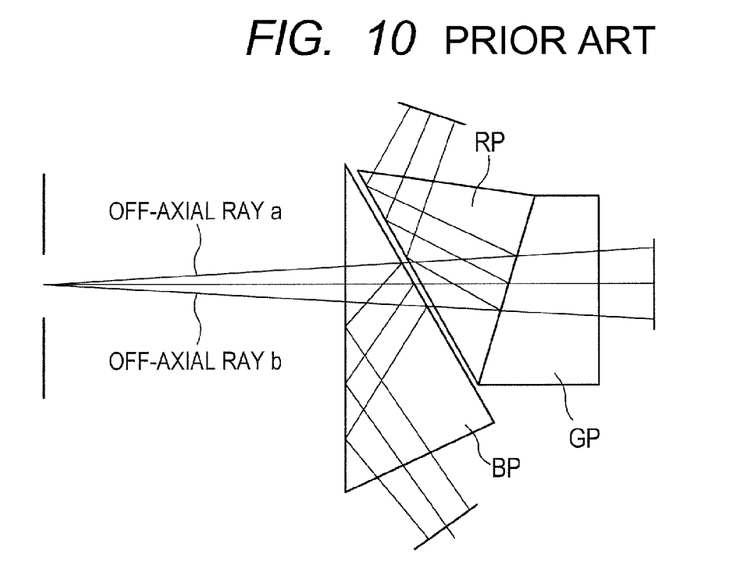
FIG. 10 is an explanatory diagram of white shading.

Here, it is known that the image pickup apparatus such as a broadcasting TV camera or a video camera is usually provided with a color separation prism for separating incident light from the lens apparatus into three color light rays, which include a red color light ray, a green color light ray, and a blue color light ray. The color separation prism includes a dichroic film that reflects only specific color light so as to separate the color light in a desired wavelength range. It is known that as the incident angle of light entering the dichroic film becomes larger, the characteristic thereof is shifted more to a short wavelength side, because the dichroic film is formed of a dielectric multilayer film. FIG. 10 illustrates a Philips type three-color separation prism that is generally used. Light rays a and b in FIG. 10 are off-axial rays that form images at opposite image height positions, and the three-color separation prism includes color separation prisms BP, RP, and GP for separating blue color light, red color light, and green color light, respectively. The off-axial ray a in FIG. 10 enters a reflection surface of the blue color light separation prism BP at a smaller incident angle than the off-axial ray b, and enters a reflection surface of the red color light separation prism RP at a larger incident angle than the off-axial ray b. As described above, as the incident angle of the light entering the reflection surface having the dichroic film becomes larger, the characteristic thereof is shifted more to the short wavelength side. Therefore, due to an incident angle difference between the off-axial rays a and b to the prisms BP and RP, white shading occurs in which the screen is colored in an up and down direction.

Figure 11A:
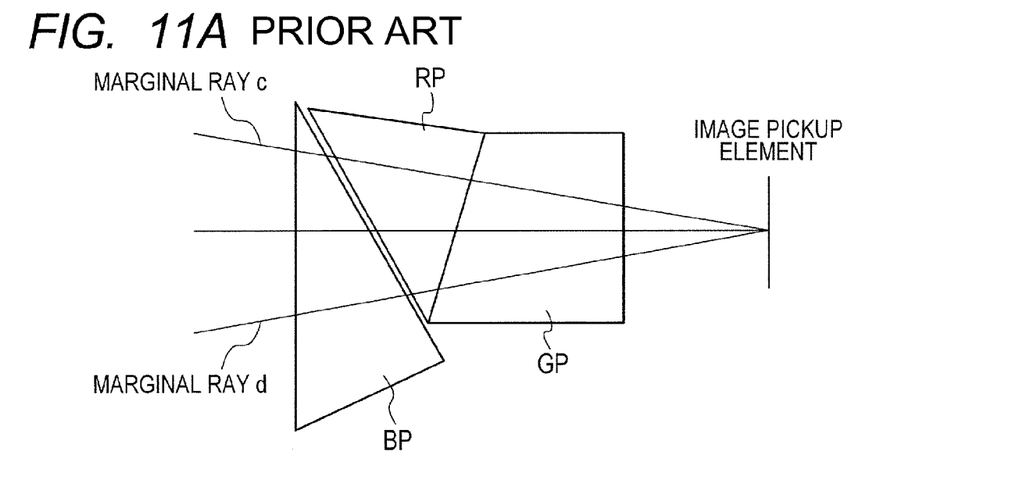
FIGS. 11A, 11B, 11C and 11D are explanatory diagrams of coloring of a blurred image.
Figure 11B:
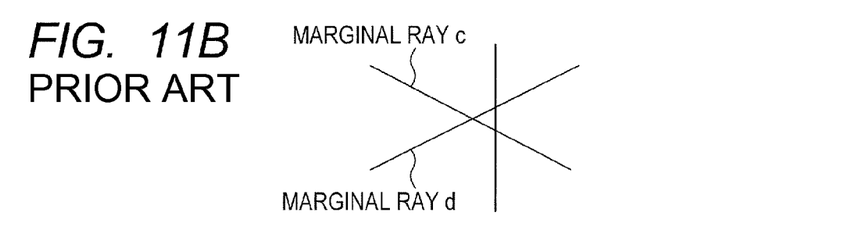
Figure 11C:
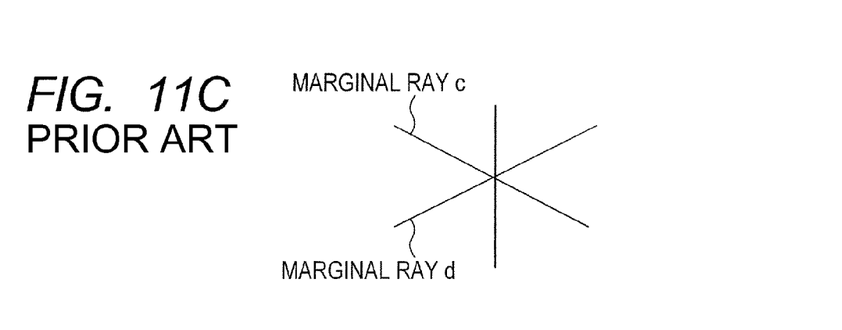
Figure 11D:
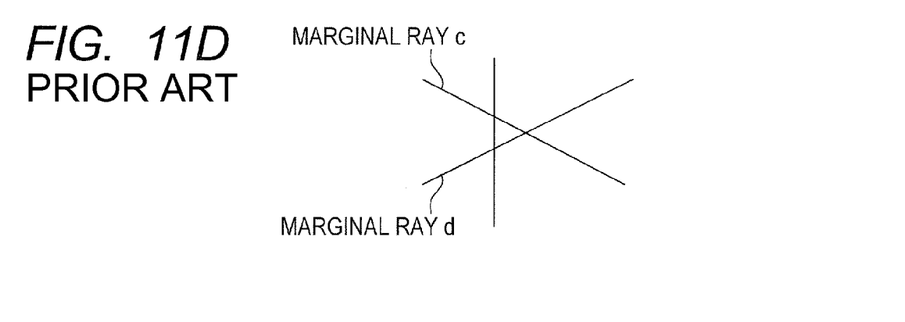

Similarly, as to a light ray forming an image at a specific image height, light rays passing through an upper side and a lower side of the pupil have different incident angles to the dichroic film. FIG. 11A is a schematic diagram illustrating a manner in which an axial ray passes through the color separation prism and forms an image. FIG. 11A illustrates an upper marginal ray c and a lower marginal ray d. As illustrated in FIG. 11A, the marginal rays c and d have different incident angles to reflection surfaces of the prisms BP and RP. Similarly to the white shading, because the marginal rays c and d have different incident angles to the dichroic film, the spectral characteristics thereof vary. FIG. 11C illustrates a state where the center of the screen is in focus. Because the levels of coloring of the marginal rays are averaged in the in-focus state, the colored state does not occur. In contrast, FIGS. 11B and 11D illustrate unfocused states. Because color shifts of the marginal rays c and d are not averaged but appear as an image in the unfocused state, coloring of a blurred image is generated in which the blurred image is separated into magenta and green on the upper and lower sides.

When the ND filter formed of the element having the angle shading is disposed in a broadcasting TV camera or a video camera having the color separation optical system, it is considered that influences of the angle shading of the element and the dichroic film are overlapped. When the angle shading of the two elements is overlapped with each other, the white shading and the coloring of the blurred image become conspicuous. In particular, because it cannot be expected that how the image is blurred in the screen, the coloring of the blurred image cannot be electrically corrected, which becomes a large problem in a practical manner.

SUMMARY OF THE INVENTION

Therefore, the present invention provides an image pickup apparatus including a color separation optical system in which coloring of a blurred image is suppressed.

In order to achieve the above-mentioned object, according to an exemplary embodiment of the present invention, there is provided an image pickup apparatus, including: a filter unit configured to adjust a light amount of incident light from an image pickup optical system; a photoelectric transducer configured to perform photoelectric conversion of the incident light from the filter unit; and a light guide optical system configured to guide the incident light from the filter unit to the photoelectric transducer. The filter unit includes a transmittance variable element configured to adjust a transmittance of the incident light. The light guide optical system includes a color separation optical system including, in order from an object side, a first prism provided with a first dichroic film, a second prism provided with a second dichroic film, and a third prism, so as to separate the incident light into red color light, green color light, and blue color light to exit. One of the first dichroic film and the second dichroic film is a blue reflection dichroic film having a characteristic of reflecting the blue color light. A rotational position of the transmittance variable element about an optical axis is such a position that a ratio of a transmittance for the blue color light to a transmittance for the green color light of a marginal ray entering the blue reflection dichroic film at an incident angle smaller than an incident angle of a principal ray of an axial ray to the blue reflection dichroic film is smaller than a ratio of the transmittance for the blue color light to the transmittance for the green color light of the principal ray of the axial ray.

According to the present invention, it is possible to provide the image pickup apparatus including the color separation optical system in which coloring of a blurred image is suppressed.

Further features of the present invention will become apparent from the following description of exemplary embodiments with reference to the attached drawings.

DESCRIPTION OF THE EMBODIMENTS

First Embodiment

Figure 1:
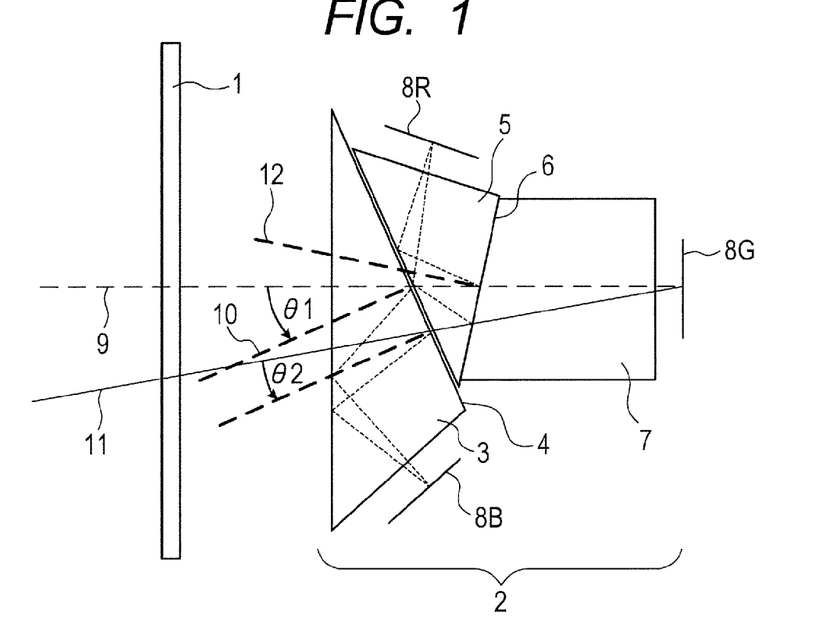
FIG. 1 is a schematic diagram of main parts of a filter unit and a camera unit according to a first embodiment of the present invention.

FIG. 1 illustrates a schematic diagram of main parts of a filter unit and a camera unit according to a first embodiment of the present invention.

An image pickup apparatus of the present invention includes, in order from an object side, a filter unit for adjusting a light amount of subject light entering through a lens apparatus (image pickup optical system), and a camera unit for forming an image signal by photoelectric conversion of the subject light after passing through the filter unit by a photoelectric transducer. A transmittance variable element 1 as the filter unit is formed of a liquid crystal element (transmittance variable ND filter) and can continuously change the transmittance for the incident light by an applied voltage. The camera unit includes a color separation optical system 2 and image pickup elements 8B, 8R, and 8G. The color separation optical system (light guide optical system) 2 in this embodiment includes, in order from the object side, a blue separation prism 3 (first prism) with an evaporated blue reflection dichroic film 4 (first dichroic film) on the reflection surface, a red separation prism 5 (second prism) with an evaporated red reflection dichroic film 6 (second dichroic film) on the reflection surface, and a green separation prism 7 (third prism). The blue separation prism 3 guides the blue color light to the image pickup element 8B, the red separation prism 5 guides the red color light to the image pickup element 8R, and the green separation prism 7 guides the green color light to the image pickup element 8G.

As illustrated in FIG. 1, the incident light from a lens apparatus (not shown) passes through the transmittance variable element 1 and is separated into blue, red, and green color light rays in this order by the color separation optical system 2. The light rays separated by the color separation prisms are guided to the image pickup elements 8B, 8R, and 8G for blue color, for red color, and for green color, respectively. The reflection surface 4 of the blue separation prism 3 has a normal 10 that crosses an optical axis 9 (of an optical system including the lens apparatus and the image pickup apparatus) at an angle θ1. In addition, the normal 10 of the reflection surface 4 of the blue separation prism 3 crosses a marginal ray 11 at an angle θ2. The reflection surface 6 of the red separation prism 5 has a normal 12. Note that, in this description, the blue color light has a wavelength of 400 to 500 nm (a typical wavelength is 435.8 nm), the green color light has a wavelength of 500 to 600 nm (a typical wavelength is 546.1 nm), and the red color light has a wavelength of 600 to 780 nm (a typical wavelength is 700 nm).

In the following, a structure of a liquid crystal transmittance variable element that constitutes the transmittance variable element of this embodiment and characteristics thereof are described.

Figure 2:
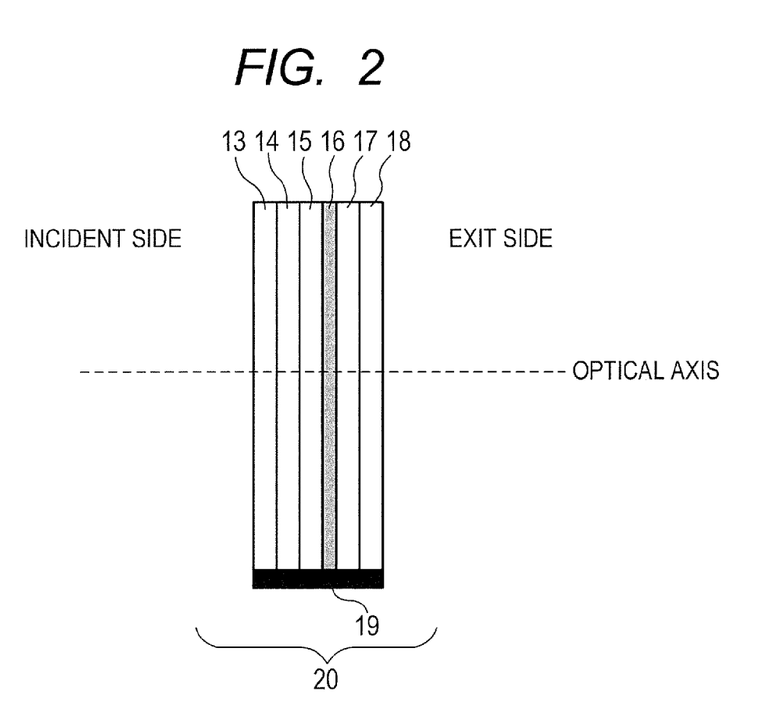
FIG. 2 illustrates a structure of a liquid crystal element.

FIG. 2 illustrates a diagram of a structure of a liquid crystal element 20 viewed from the side, which constitutes the transmittance variable element 1 of this embodiment. The liquid crystal element 20 includes, in order from a light incident side of the lens apparatus, a quarter-wave plate 13, a linear polarizer (incident side polarizer) 14, a glass substrate 15, a liquid crystal (liquid crystal element) 16, a glass substrate 17, and a linear polarizer (exit side polarizer) 18. The linear polarizers 14 and 18 are disposed so that transmission axes thereof are perpendicular to each other. In addition, in FIG. 2, the transmittance variable element has a bottom surface 19. The liquid crystal 16 is enclosed between the glass substrates 15 and 17. In addition, the glass substrates 15 and 17 are provided with film electrodes and alignment films (not shown) so that a polarization direction of light passing through the liquid crystal is twisted by 90 degrees. When a voltage is applied to the film electrodes, liquid crystal molecules are aligned along the optical axis so that the polarization direction of the light passing through the liquid crystal does not change. Because the liquid crystal element of this embodiment is configured so that the transmission axes of the linear polarizers 14 and 18 are perpendicular to each other, the polarization direction of the light after passing through the linear polarizer on the incident side is twisted by the liquid crystal by 90 degrees when the voltage is not applied to the element, so as to be parallel to the transmission axis of the linear polarizer on the exit side. On the contrary, when the voltage is applied so that the liquid crystal molecules are aligned along the optical axis, the polarization direction of the light after passing through the linear polarizer on the incident side is not changed and is perpendicular to the transmission axis of the linear polarizer on the exit side, and hence the light does not pass through the element. In a transient state between the twisted state and the aligned state of the liquid crystal, the transmittance of the transmittance variable element is continuously changed. In the structure of the present invention, the incident light from the lens apparatus to the transmittance variable element as the filter unit enters in a converging state.

As described above, the liquid crystal element (transmitting part) 20 of this embodiment is formed of a so-called twisted nematic (TN) liquid crystal, whose transmittance becomes maximum when a voltage is not applied.

Figure 3:
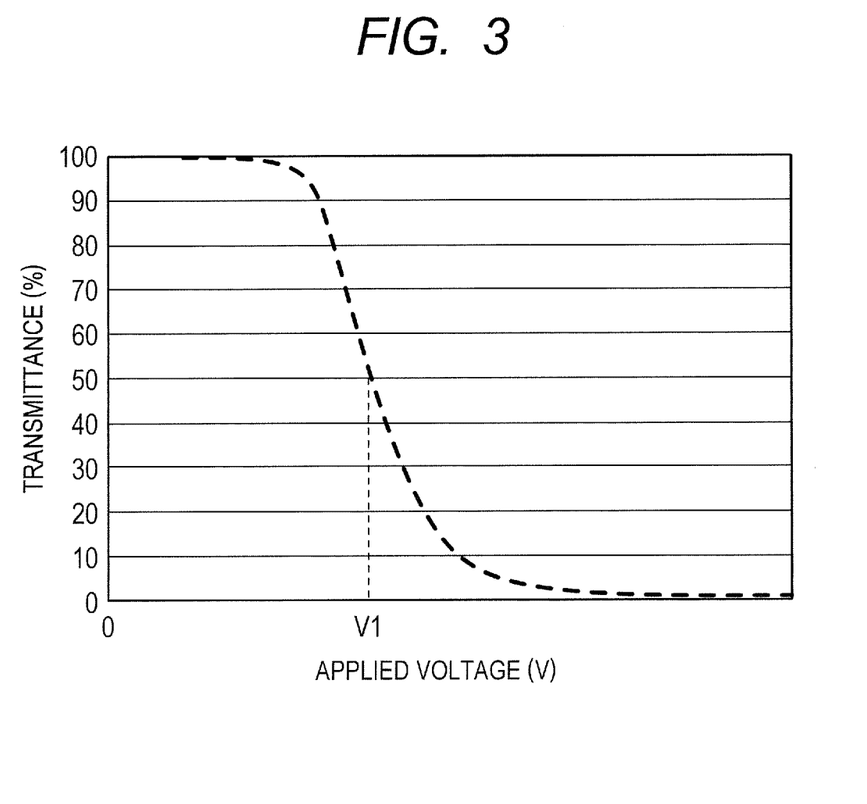
FIG. 3 shows a relationship between an applied voltage and a transmittance.

FIG. 3 shows a relationship between the voltage applied to the transmittance variable element and the transmittance.

Here, as shown in FIG. 3, a voltage when the transmittance of the transmittance variable element becomes a half of that without the applied voltage is supposed to be V1. Then, a view angle characteristic of the liquid crystal element when the voltage V1 is applied to the element is described below.

Figure 4A:
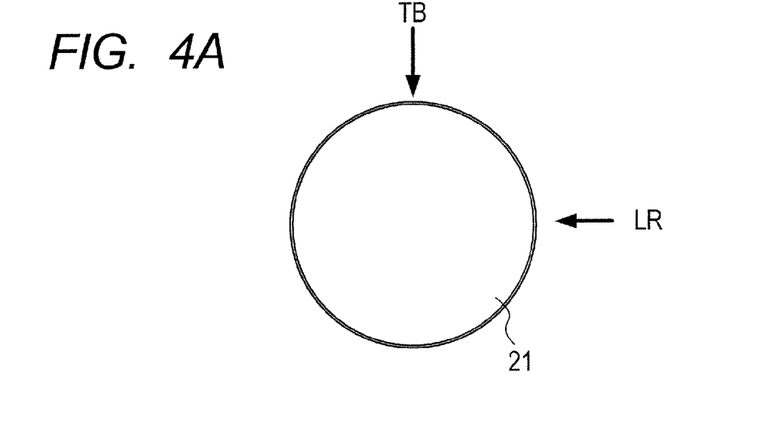
FIGS. 4A, 4B and 4C are schematic diagrams of the liquid crystal element.
Figure 4B:
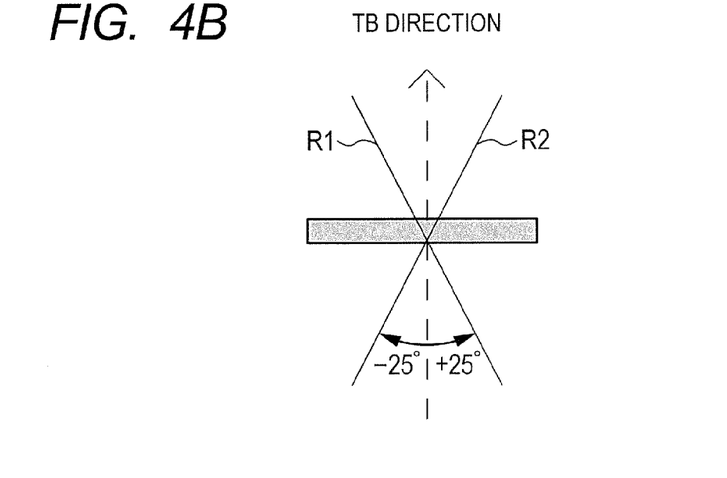
Figure 4C:
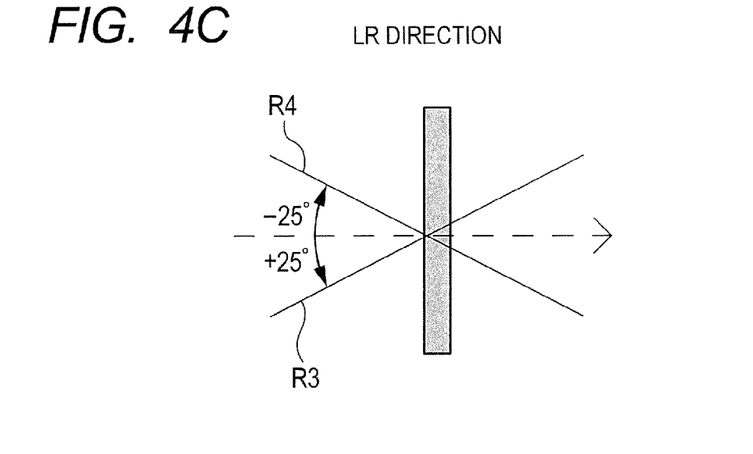

FIG. 4A is a diagram of the transmittance variable element 1 viewed from the object side to an image plane side, with the bottom surface 19 of the transmittance variable element located on the lower side. FIG. 4B is a diagram of the transmittance variable element 1 viewed from a TB direction of FIG. 4A, and illustrates a light ray R1 entering the transmittance variable element at an incident angle of +25 degrees and a light ray R2 entering the transmittance variable element at an incident angle of −25 degrees. FIG. 4C is a diagram of the transmittance variable element 1 viewed from an LR direction different from the TB direction by 90 degrees as illustrated in FIG. 4A, and illustrates a light ray R3 entering the transmittance variable element 1 at an incident angle of +25 degrees and a light ray R4 entering the transmittance variable element 1 at an incident angle of −25 degrees. Broken lines in FIGS. 4B and 4C indicate the optical axis, and the arrow direction thereof indicates the direction from the object side to the image plane side.

Figure 5:
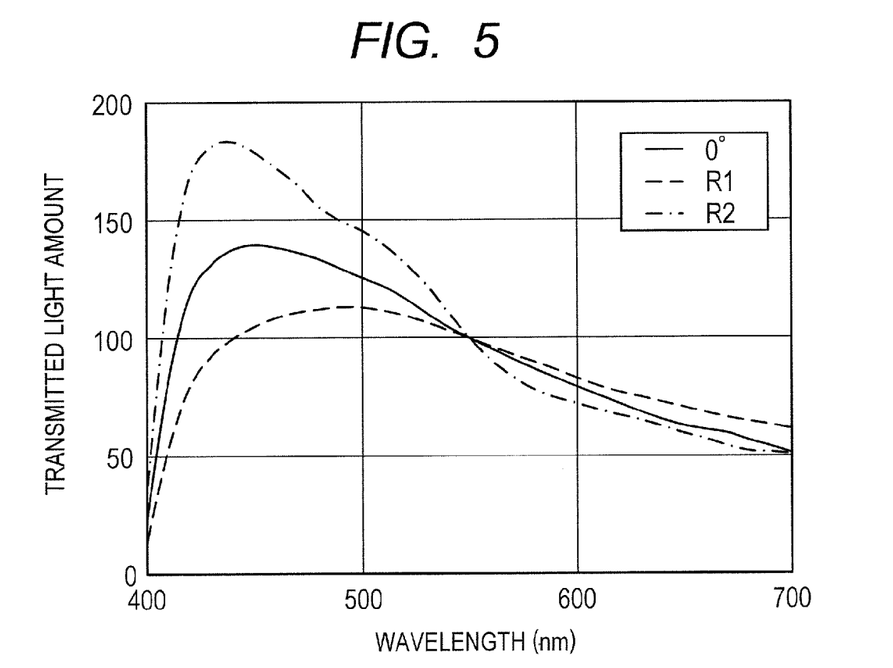
FIG. 5 shows a relationship between spectral transmission characteristics and an incident angle (TB direction).
Figure 6:
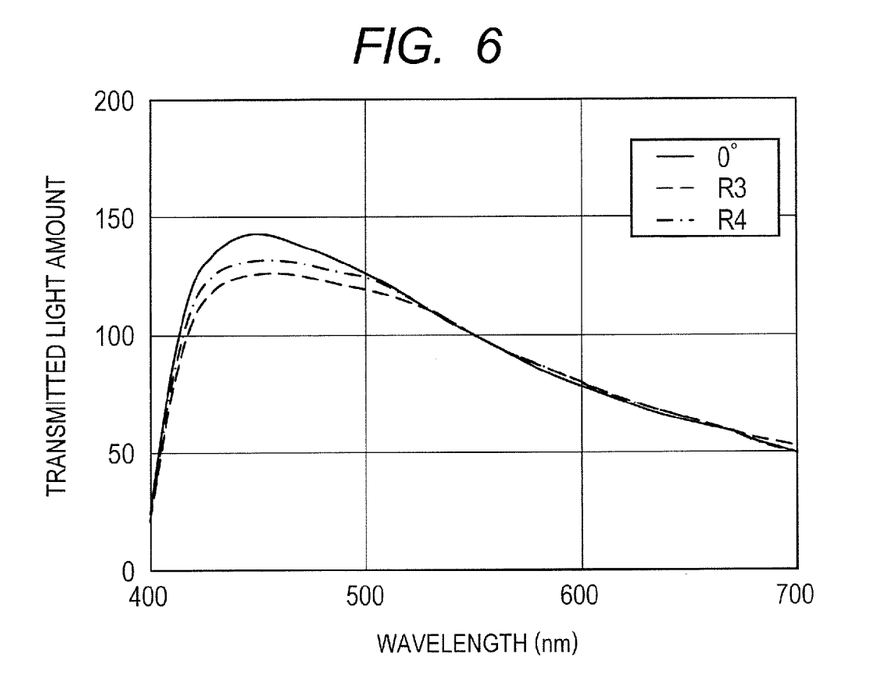
FIG. 6 shows a relationship between the spectral transmission characteristics and the incident angle (LR direction).

FIG. 5 shows spectral transmission characteristics of a light ray that enters perpendicularly the transmittance variable element 1 (at an incident angle of 0 degrees), the light ray R1 entering at an incident angle of +25 degrees in the TB direction illustrated in FIG. 4B, and the light ray R2 entering at an incident angle of −25 degrees. Similarly, FIG. 6 shows spectral transmission characteristics of the light ray that enters perpendicularly the transmittance variable element 1 (at an incident angle of 0 degrees), the light ray R3 entering the transmittance variable element 1 at an incident angle of +25 degrees in the LR direction illustrated in FIG. 4C, and the light ray R4 entering at an incident angle of −25 degrees. Note that, in FIGS. 5 and 6, the green color light is a reference, and in order to clearly show ratios of transmission light amounts of other colors, the transmission light amounts are normalized so that a transmission light amount at a wavelength of 550 nm becomes 100.

As shown in FIG. 5, viewing the transmittance variable element from the TB direction, the light ray R1 having a positive incident angle has a smaller transmission light amount of the blue color light than the light ray entering perpendicularly, and the light ray R2 having a negative incident angle has a larger transmission light amount of the blue color light than the light ray entering perpendicularly. In contrast, as shown in FIG. 6, viewing the transmittance variable element from the LR direction, even when the incident angle changes as in the cases of the light rays R3 and R4, a change of the spectral transmission characteristics is substantially zero.

Next, angle shading due to the blue reflection dichroic film of this embodiment is described below in detail.

Figure 7:
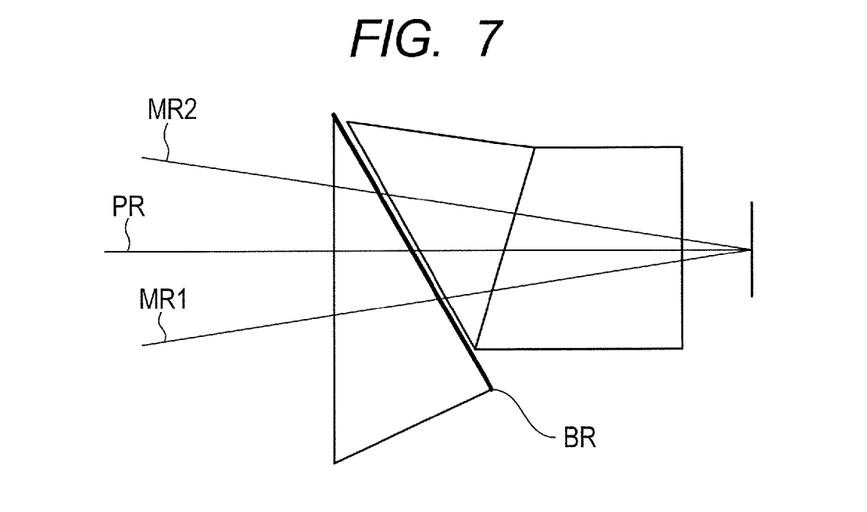
FIG. 7 is a schematic diagram of an axial ray.

FIG. 7 is a diagram schematically illustrating light rays forming an image on the optical axis. The incident angle of the light entering a blue reflection dichroic film BR is largest in an upper marginal ray MR2, and decreases in order of an axial ray PR and a lower marginal ray MR1.

Figure 8:
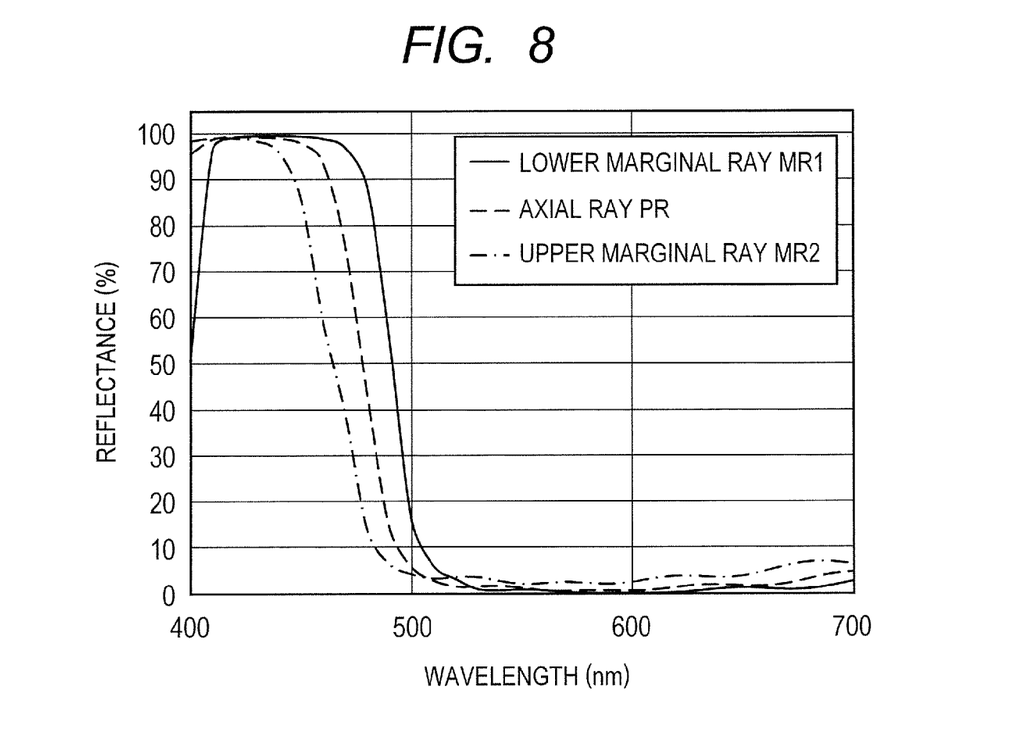
FIG. 8 shows a spectral reflectance of a blue reflection dichroic film.

FIG. 8 shows spectral reflectances of the blue reflection dichroic film BR for the axial ray PR, the lower marginal ray MR1, and the upper marginal ray MR2 illustrated in FIG. 7. Characteristic curves of the spectral reflectances are shifted more to the short wavelength side in order of the lower marginal ray MR1, the axial ray PR, and the upper marginal ray MR2. In other words, as the incident angle to the blue reflection dichroic film BR becomes larger, the characteristic curve of the spectral reflectance of the blue reflection dichroic film BR is shifted more to the short wavelength side, and hence the reflectance of the blue reflection dichroic film BR in a blue color wavelength range becomes lower. Therefore, there is a tendency that a light amount of the blue color light guided to the image pickup element 8B is decreased.

Here, as illustrated in FIG. 1, the incident angle θ2 of the marginal ray 11 to the reflection surface 4 of the blue separation prism 3 is smaller than the incident angle θ1 of an axial principal ray to the reflection surface 4 of the blue separation prism 3. In this relationship, a reflection characteristic of the blue reflection dichroic film for the marginal ray 11 has a characteristic in which a reflected light amount of the blue color light is larger than that of the axial ray PR similarly to the above-mentioned lower marginal ray MR1.

In the present invention, the transmittance variable element is disposed by determining a rotational position thereof about the optical axis so that, when the marginal ray 11 having the same reflection characteristic of the blue reflection dichroic film BR as the lower marginal ray MR1 passes through the transmittance variable element 1, the characteristic of the light ray R1 shown in FIG. 5 is exhibited. Thus, image quality degradation due to dependence of the reflectance of the blue reflection dichroic film BR for the light ray MR1 on the incident angle and image quality degradation due to dependence of the transmittance of the transmittance variable element 1 for the light ray R1 on the incident angle can be offset by each other to be reduced. Here, the rotational position about the optical axis is, in other words, a position in the rotational direction about the optical axis in a plane perpendicular to the optical axis.

In other words, the transmittance variable element is disposed by determining a rotational position thereof about the optical axis so that the following condition is satisfied. A ratio of a transmittance of the transmittance variable element for the blue color light to a transmittance for the green color light of a marginal ray entering the blue reflection dichroic film at a smaller incident angle than an incident angle of the principal ray of the axial ray to the blue reflection dichroic film becomes lower than a ratio of a transmittance of the transmittance variable element for the blue color light to a transmittance for the green color light of the principal ray of the axial ray.

In addition, it is more preferred to dispose the transmittance variable element by determining the position thereof in the rotational direction about the optical axis so that the direction in which the dependence of the relative transmittance of the transmittance variable element for the blue color light to that for the green color light on the incident angle becomes largest is included in the plane including the two marginal rays having a largest difference of incident angles to the blue reflection dichroic film and the optical axis. In this case, the transmittance variable element is disposed by determining the position in the rotational direction about the optical axis so that a ratio of the transmittance for the blue color light to the transmittance for the green color light of a marginal ray having a small incident angle to the blue reflection dichroic film becomes smaller than a ratio of the transmittance for the blue color light to the transmittance for the green color light of a marginal ray having a large incident angle to the blue reflection dichroic film.

Specifically, the position of the transmittance variable element 1 in the rotational direction about the optical axis is determined so that the bottom surface 19 of the transmittance variable element determined in FIG. 2 is disposed on the back side of the drawing sheet of FIG. 1.

In this embodiment, the above-mentioned ratio is exemplified as a ratio to the transmittance for the green color light having a wavelength of 550 nm, but this is not a limitation. It is possible to define the ratio as a ratio to a transmittance for light having a wavelength in a red color range so as to obtain the effect of the present invention.

As described above, the transmittance variable element is disposed in such a direction that the angle shading in the transmittance variable element and the angle shading in the blue reflection dichroic film are offset by each other, and hence coloring of a blurred image is suppressed.

Second Embodiment

Figure 9:
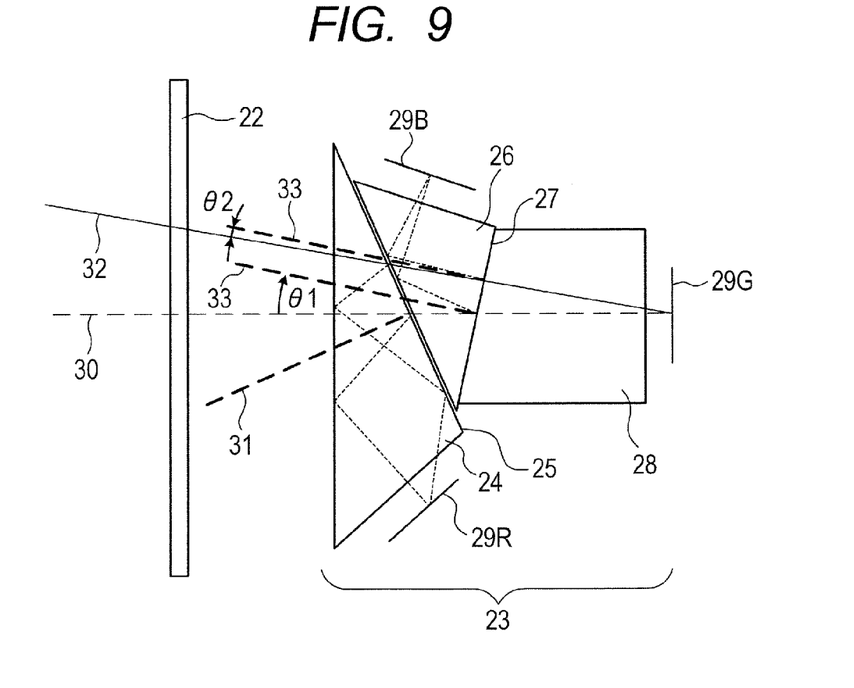
FIG. 9 is a schematic diagram of main parts of a filter unit and a camera unit according to a second embodiment of the present invention.

FIG. 9 illustrates a schematic diagram of a main part of an image pickup apparatus according to a second embodiment of the present invention.

In the image pickup apparatus of this embodiment, a structure of a color separation optical system 23 is different from that of the color separation optical system (light guide optical system) 2 in the first embodiment. The color separation optical system 23 of this embodiment includes, in order from the object side, a red separation prism 24 (first prism) with a red reflection dichroic film (first dichroic film) evaporated on the reflection surface, a blue separation prism 26 (second prism) with a blue reflection dichroic film 27 (second dichroic film) evaporated on the reflection surface, and a green separation prism 28 (third prism) for guiding the green color light to the image pickup element. In this embodiment, the incident light from a lens apparatus (not shown) passes through a transmittance variable element 22 having the same structure as in the first embodiment illustrated in FIG. 2 and is separated by the color separation optical system 23 into red color light, blue color light, and green color light in this order. A normal 33 of the reflection surface of the blue separation prism crosses an optical axis 30 at the angle θ1. A marginal ray 32 crosses the normal 33 of the reflection surface of the blue separation prism at the angle θ2. The reflection surface of the red separation prism has a normal 31.

In this embodiment too, similarly to the first embodiment, the incident angle θ2 of the marginal ray 32 to the blue separation prism is smaller than the incident angle θ1 of the axial principal ray to the blue separation prism. In this relationship, reflected light of the marginal ray 32 entering the blue reflection surface 27 has a larger reflected light amount of the blue color light than that of the axial ray PR similarly to the above-mentioned lower marginal ray MR1.

In this embodiment too, similarly to the first embodiment, the transmittance variable element 22 is disposed by determining the rotational position thereof about the optical axis so that the characteristic of the light ray R1 shown in FIG. 5 is exhibited when the marginal ray 32 having the same reflection characteristic as the lower marginal ray MR1 on the blue reflection dichroic film BR passes through the transmittance variable element 22. Thus, the image quality degradation due to dependence of the reflectance of the blue reflection dichroic film BR for the light ray MR1 on the incident angle and the image quality degradation due to dependence of the transmittance of the transmittance variable element 22 for the light ray R1 on the incident angle can be offset by each other to be reduced.

In other words, the transmittance variable element is disposed by determining a rotational position thereof about the optical axis so that the ratio of a transmittance of the transmittance variable element for the blue color light to a transmittance for the green color light of a marginal ray entering the blue reflection dichroic film at a smaller incident angle than an incident angle of the principal ray of the axial ray to the blue reflection dichroic film becomes lower than the ratio of a transmittance of the transmittance variable element for the blue color light to a transmittance for the green color light of the principal ray of the axial ray.

In addition, it is more preferred to dispose the transmittance variable element by determining the position in the rotational direction about the optical axis so that the direction (LR direction) in which the dependence of the ratio of the transmittance of the transmittance variable element for the blue color light to that for the green color light on the incident angle becomes largest is included in the plane including the optical axis in which a difference of incident angles to the blue reflection dichroic film between two marginal rays becomes largest. In this case, the transmittance variable element is disposed by determining the position thereof in the rotational direction about the optical axis so that the ratio of the blue color light with respect to the marginal ray having a small incident angle to the blue reflection dichroic film becomes smaller than the ratio of the blue color light with respect to the marginal ray having a large incident angle to the blue reflection dichroic film.

Specifically, the position of the transmittance variable element in the rotational direction about the optical axis is determined so that the bottom surface 19 of the transmittance variable element determined in FIG. 2 is disposed on the front side of the drawing sheet of FIG. 9.

In this way, the structure of the present invention can obtain the same effect even when the order of color separation by the color separation optical system is changed.

As described above with examples, the present invention is applied to an image pickup apparatus including, in order from the object side, a filter unit (transmittance variable element) which adjusts a light amount of subject light entering through an image pickup lens, and a camera unit which forms an image signal by photoelectric conversion of the subject light through the filter unit. However, the present invention is not limited to this structure. The present invention can be similarly applied to an image pickup system including, in order from the object side, an image pickup lens, a filter unit (transmittance variable element) which adjusts a light amount of subject light entering through the image pickup lens, and a camera unit which forms an image signal by photoelectric conversion of the subject light through the filter unit, so as to obtain the effect of the present invention.

The exemplary embodiments of the present invention are described above, but the present invention is not limited to those embodiments and can be modified and changed variously within the spirit thereof. For instance, the structure of the transmittance variable element is not limited to those of the embodiments. Further, the element itself is not limited to the liquid crystal element and may be formed of an element having angle shading similar to that of the present invention, and hence the same effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-118537, filed May 24, 2012, which is hereby incorporated by reference herein in its entirety.

What is claimed is:

1. An image pickup apparatus, comprising:
a filter unit configured to adjust a light amount of incident light from an image pickup optical system;
a photoelectric transducer configured to perform photoelectric conversion of the incident light from the filter unit; and
a light guide optical system configured to guide the incident light from the filter unit to the photoelectric transducer, wherein:
the filter unit comprises a transmittance variable element configured to adjust a transmittance of the incident light;
the light guide optical system comprises a color separation optical system comprising, in order from an object side, a first prism provided with a first dichroic film, a second prism provided with a second dichroic film, and a third prism, so as to separate the incident light into red color light, green color light, and blue color light to exit;
one of the first dichroic film and the second dichroic film is a blue reflection dichroic film having a characteristic of reflecting the blue color light; and
a rotational position of the transmittance variable element about an optical axis is such a position that a ratio of a transmittance for the blue color light to a transmittance for the green color light of a marginal ray entering the blue reflection dichroic film at an incident angle smaller than an incident angle of a principal ray of an axial ray to the blue reflection dichroic film is smaller than a ratio of the transmittance for the blue color light to the transmittance for the green color light of the principal ray of the axial ray.

2. An image pickup apparatus according to claim 1, wherein the color separation optical system comprises a blue reflection dichroic film on the first prism.

3. An image pickup apparatus according to claim 1, wherein the color separation optical system comprises a blue reflection dichroic film on the second prism.

4. An image pickup apparatus according to claim 1, wherein the transmittance variable element comprises a liquid crystal transmittance variable element.

5. An image pickup apparatus according to claim 1, wherein the transmittance variable element comprises, in order from the object side, an incident side polarizer, a liquid crystal element, and an exit side polarizer.

6. An image pickup apparatus according to claim 1, wherein a light ray enters the filter unit from the image pickup optical system in a converging state.

7. An image pickup system, comprising:
an image pickup apparatus; and
an image pickup optical system configured to guide a light ray from a subject to the image pickup apparatus,
wherein the image pickup apparatus, comprising:
a filter unit configured to adjust a light amount of incident light from an image pickup optical system;
a photoelectric transducer configured to perform photoelectric conversion of the incident light from the filter unit; and
a light guide optical system configured to guide the incident light from the filter unit to the photoelectric transducer, wherein:
the filter unit comprises a transmittance variable element configured to adjust a transmittance of the incident light;
the light guide optical system comprises a color separation optical system comprising, in order from an object side, a first prism provided with a first dichroic film, a second prism provided with a second dichroic film, and a third prism, so as to separate the incident light into red color light, green color light, and blue color light to exit;
one of the first dichroic film and the second dichroic film is a blue reflection dichroic film having a characteristic of reflecting the blue color light; and
a rotational position of the transmittance variable element about an optical axis is such a position that a ratio of a transmittance for the blue color light to a transmittance for the green color light of a marginal ray entering the blue reflection dichroic film at an incident angle smaller than an incident angle of a principal ray of an axial ray to the blue reflection dichroic film is smaller than a ratio of the transmittance for the blue color light to the transmittance for the green color light of the principal ray of the axial ray.

* * * * *